US012753867B2

(12) United States Patent
Clements

(10) Patent No.: US 12,753,867 B2
(45) Date of Patent: Oct. 6, 2026

(54) WIRE SECUREMENT

(71) Applicant: Baker Hughes Energy Technology UK Limited, Bristol (GB)

(72) Inventor: Richard Clements, Newcastle Upon Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 119 days.

(21) Appl. No.: 17/755,421

(22) PCT Filed: Oct. 27, 2020

(86) PCT No.: PCT/GB2020/052716
§ 371 (c)(1),
(2) Date: Apr. 28, 2022

(87) PCT Pub. No.: WO2021/084240
PCT Pub. Date: May 6, 2021

(65) Prior Publication Data

US 2022/0390051 A1 Dec. 8, 2022

(30) Foreign Application Priority Data

Oct. 30, 2019 (GB) ..................................... 1915705

(51) Int. Cl.
*F16L 33/01* (2006.01)
*F16L 33/34* (2006.01)

(52) U.S. Cl.
CPC ............... *F16L 33/01* (2013.01); *F16L 33/34* (2013.01)

(58) Field of Classification Search
CPC .................................. F16L 33/01; F16L 33/34
See application file for complete search history.

(56) References Cited

U.S. PATENT DOCUMENTS

| | | | | |
|---|---|---|---|---|
| 3,936,118 | A * | 2/1976 | Thiery | F16L 33/01 |
| 2006/0082140 | A1 | 4/2006 | Rytter | |
| 2010/0230952 | A1* | 9/2010 | Ong | F16L 33/01 |
| 2016/0016708 | A1* | 1/2016 | Le Blan | F16L 33/01 |
| 2016/0208969 | A1* | 7/2016 | Bertoni | F16L 33/01 |
| 2016/0290539 | A1* | 10/2016 | Nielsen | F16L 33/01 |
| 2017/0299092 | A1* | 10/2017 | Larsen | F16L 33/01 |
| 2019/0017641 | A1* | 1/2019 | Phillips | F16L 33/01 |

(Continued)

FOREIGN PATENT DOCUMENTS

| | | | |
|---|---|---|---|
| CN | 101473156 | A | 7/2009 |
| EP | 2230432 | A2 | 9/2010 |
| FR | 3 074 251 | A1 | 5/2019 |

(Continued)

*Primary Examiner* — Zachary T Dragicevich
(74) *Attorney, Agent, or Firm* — Hogan Lovells Cadwalader US LLP

(57) ABSTRACT

A method of securing flexible pipe body tensile armour wires in an end fitting and apparatus for terminating flexible pipe body are disclosed. The method comprises the steps of locating a respective free end region of at least one tensile armour wire of an armour layer comprising a plurality of tensile armour wires, through an opening in a rigid flange region that extends radially outwardly from an end fitting body, and securing each said at least one tensile armour wire to the rigid flange region thereby securing said at least one tensile armour wire to the end fitting body.

15 Claims, 10 Drawing Sheets

(56) References Cited

U.S. PATENT DOCUMENTS

2021/0108743 A1 * 4/2021 Dehais .................... F16L 33/01

FOREIGN PATENT DOCUMENTS

| | | | |
|---|---|---|---|
| GB | 896485 | A | 5/1962 |
| WO | 2004/051131 | A1 | 6/2004 |
| WO | 2007/144550 | A1 | 12/2007 |
| WO | 2016/092282 | A1 | 6/2016 |
| WO | 2019/105926 | A1 | 6/2019 |

* cited by examiner

WIRE SECUREMENT

CROSS-REFERENCE TO RELATED APPLICATIONS

This application is a national stage entry of PCT Application No. PCT/GB2020/052716, filed Oct. 27, 2020, which claims priority to GB Patent Application No. 1915705.6, filed Oct. 30, 2019, both of which are incorporated by reference herein in their entirety for all intents and purposes.

BACKGROUND

The present invention relates to a method and apparatus for securing flexible pipe body tensile armour wires in an end fitting. In particular, but not exclusively, the present invention relates to individually and independently securing each of the tensile armour wires of a flexible pipe to a rigid flange region of an end fitting body and optionally thereby securing each armour wire to the end fitting body at a desired predetermined tension.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

Often flexible pipe body includes one or more tensile armour layers. Each tensile armour layer includes many separate tensile armour wires which are helically wound along a whole length of the flexible pipe body of a flexible pipe. Terminating ends of these wires has conventionally been a complex and indeed difficult procedure. Conventionally during a termination process wires have had to be peeled away from an underlying surface and supported by various structures with cut ends being crimped so that these anchor to some extent within the end fitting body. The folding process of each wire is onerous and can cause over bending of individual wires. Likewise crimping individual wires is onerous and time consuming and does not necessarily result in each individual wire being locked in an end fitting with respect to axial movement. Furthermore a range of tensions can result across all tensile armour wires during the termination process. This lack of consistency can cause problems.

SUMMARY

It is an aim of the present invention to at least partly mitigate one or more of the above-mentioned problems.

It is an aim of certain embodiments of the present invention to provide a method of securing flexible pipe body tensile armour wires in an end fitting.

It is an aim of certain embodiments of the present invention to provide apparatus for terminating flexible pipe body.

It is an aim of certain embodiments of the present invention to provide a method and apparatus which enables tensile armour wires from a flexible pipe body segment to be individually terminated within an end fitting in a way which is convenient for users carrying out the termination process.

It is an aim of certain embodiments of the present invention to provide a method and apparatus for individually and independently securing flexible pipe body tensile armour wires in an end fitting whereby a tension in each of the armour wires so secured is the same or very closely the same.

It is an aim of certain embodiments of the present invention to provide a method and apparatus for securing flexible pipe body that is applicable to end fittings that include an integral elongate end fitting body or end fittings which include a termination member and a core member.

According to a first aspect of the present invention there is provided a method of securing flexible pipe body tensile armour wires in an end fitting, comprising the steps of:

- locating a respective free end region of at least one tensile armour wire of an armour layer comprising a plurality of tensile armour wires, through an opening in a rigid flange region that extends radially outwardly from an end fitting body; and
- securing each said at least one tensile armour wire to the rigid flange region thereby securing said at least one tensile armour wire to the end fitting body.

Aptly the method further comprises securing each tensile armour wire to the rigid flange at a predetermined tension.

Aptly the predetermined tension comprises a tension of between 1 and 2000 N/mm$^2$.

Aptly the method further comprises securing all tensile armour wires of the armour layer to the rigid flange at a common tension and optionally securing all of a further plurality of tensile armour wires of a further armour layer to the rigid flange.

Aptly the method further comprises prior to securing each tensile armour wire to the rigid flange, urging the tensile armour wire in a direction generally away from a remainder of the flexible pipe body thereby removing slack from each tensile armour wire between the flange region and a lift off point where the tensile armour wire begins to extend radially outwardly away from an underlying layer in the flexible pipe body.

Aptly the method further comprises providing an end fitting body that comprises a connector flange end and an open mouth end proximate to a cut end of flexible pipe body whereby at least an end region of a fluid retaining layer of the flexible pipe body is disposed radially within the end fitting body at the open mouth end.

Aptly the flange region comprises a plurality of openings circumferentially arranged around the flange region and the method further comprises:

locating a respective free end region of each of all tensile armour wires of the plurality of tensile armour wires in a respective opening of the plurality of openings.

Aptly the method further comprises securing a jacket to a central flange region that extends radially outwardly from the end fitting body and that is located at a first longitudinal position spaced apart from a second longitudinal position where the rigid flange region is located; and subsequently securing an activation flange to the jacket.

Aptly the method further comprises providing epoxy material in an enclosed chamber disposed between a radially inner surface of the jacket, an inner surface of the activation flange and a radially outer surface of the end fitting body.

Aptly the method further comprises providing the epoxy material to a first end region of the enclosed chamber at a first side of the rigid flange region via a first epoxy fill port.

Aptly the method further comprises providing the epoxy material to a further end region of the enclosed chamber at a further side of the rigid flange region via a further epoxy fill port.

Aptly the method further comprises each opening comprises a through-hole through the rigid flange region and said step of locating a respective free end region comprises threading an end of the free end region through an associated through-hole.

Aptly each through-hole has a circular-shaped or stadium-shaped or elliptical-shaped cross section.

Aptly the method further comprises each opening comprises a slit that extends a predetermined distance from a peripheral edge region of the rigid flange region and said step of locating a respective free end region comprises sliding a selected edge of the free end region radially inwardly into the slit and subsequently urging a free end of the free end region away from the rigid flange region.

Aptly the method further comprises providing a respective nut element at a threaded portion of each free end region and selectively rotating each nut element to draw the free end region of an associated wire through an opening in the rigid flange region.

Aptly the method further comprises subsequently tightening a locking nut element on each free end region until the locking nut element abuts with the first locking nut element.

According to a second aspect of the present invention there is provided apparatus for terminating flexible pipe body, comprising:

an elongate rigid end fitting body that comprises an open mouth at a first end of the end fitting body, a connector flange at a remaining end of the end fitting body and an intermediate flange that is securable to an end of an end fitting jacket; and a rigid flange region that extends radially outwardly between the intermediate flange and the open mouth away from a longitudinal axis associated with the end fitting body and that comprises a plurality of openings disposed circumferentially around the rigid flange region through which a flexible pipe body tensile wire is locatable.

Aptly each opening is a through-hole or slit in the rigid flange region.

Aptly each opening is a non-threaded opening.

Aptly each through-hole is round-shaped or stadium-shaped or elliptical-shaped.

Aptly each slit extends from a circumferential edge of the rigid flange region and has a slit axis through the rigid flange that is non-orthogonal to side rolls of the rigid flange region.

Aptly the apparatus further comprises the end fitting body is integrally formed.

Aptly the elongate end fitting body comprises a termination member that includes the connector flange, a neck region of the end fitting body and a first portion of the intermediate flange; and a core member that comprises a further portion of the intermediate flange, a core end that defines the open mouth, and the rigid flange region and wherein optionally the core member is integrally formed.

Certain embodiments of the present invention provide a method of securing tensile armour wires from one or more tensile armour layers of flexible pipe body in an end fitting. The securing procedure is convenient for users involved in the termination process and optionally enables a tension in each of the so-terminated wires to be set within a narrow range around or exactly at a predetermined tension.

Certain embodiments of the present invention provide an end fitting that can be utilised in a flexible pipe termination process whereby the end fitting body itself includes openings to receive individual wires. This helps locate wires at a predetermined circumferential orientation in an even (or uneven if desired) distribution.

Certain embodiments of the present invention provide an end fitting body which enables tensile armour wires to be secured to a end fitting body via a mechanism which permits tension in each individual wire of the many tensile armour wires to be individually set. As a result all tensile armour wires can be terminated sharing a common tension or very closely sharing a common tension. Alternatively tension in groups of wires at various circumferential regions can be selected to be different according to need.

BRIEF DESCRIPTION OF THE DRAWINGS

Certain embodiments of the present invention will now be described hereinafter, by way of example only, with reference to the accompanying drawings in which.

In the drawings like reference numerals refer to like parts.

DETAILED DESCRIPTION

Throughout this description, reference will be made to a flexible pipe. It is to be appreciated that certain embodiments of the present invention are applicable to use with a wide variety of flexible pipe. For example certain embodiments of the present invention can be used with respect to flexible pipe body and associated end fittings of the type which is manufactured according to API 17J. Such flexible pipe is often referred to as unbonded flexible pipe. Other embodiments are associated with other types of flexible pipe.

Figure 1:
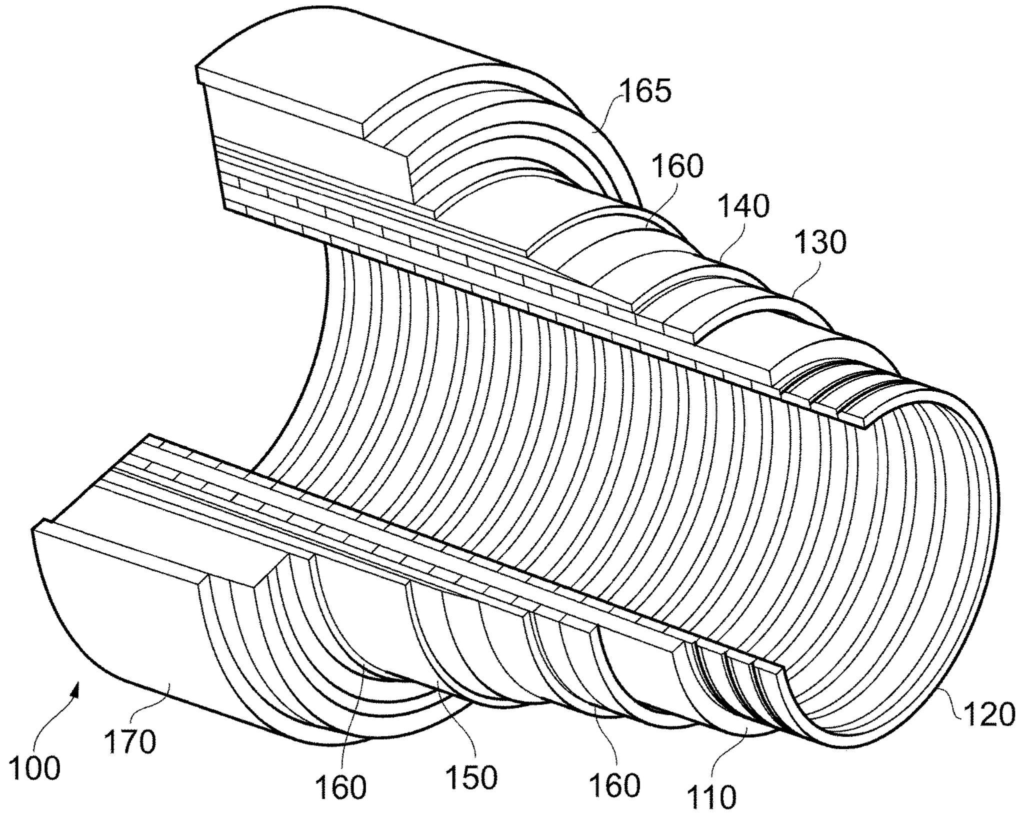
FIG. 1 illustrates flexible pipe body.

Turning to FIG. 1 it will be understood that the illustrated flexible pipe is an assembly of a portion of pipe body and one or more end fittings (not shown) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

The pipe body includes a pressure armour layer 130 that is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is formed from a plurality of wires (to impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging". The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment. Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
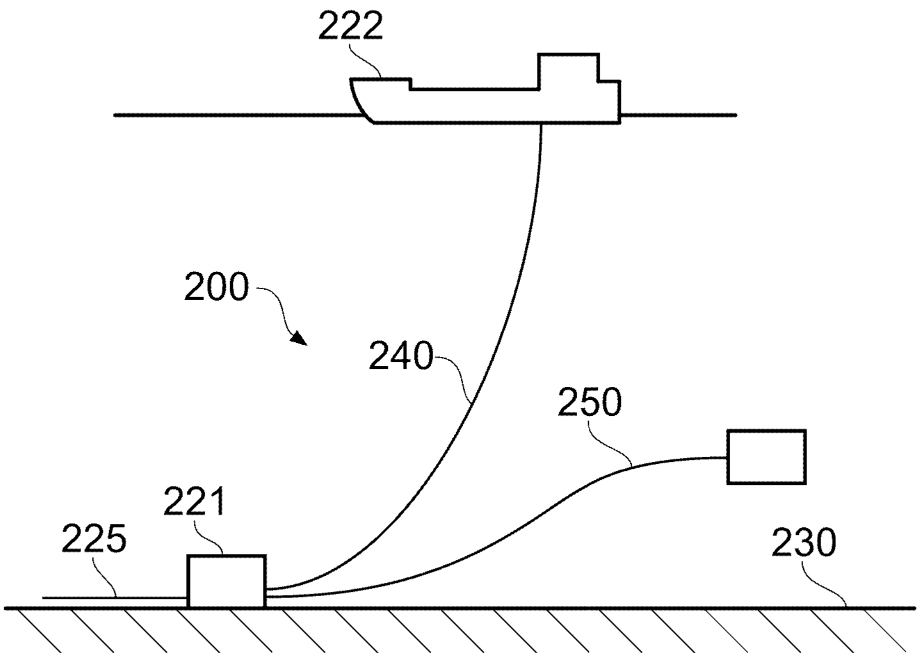
FIG. 2 illustrates certain uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
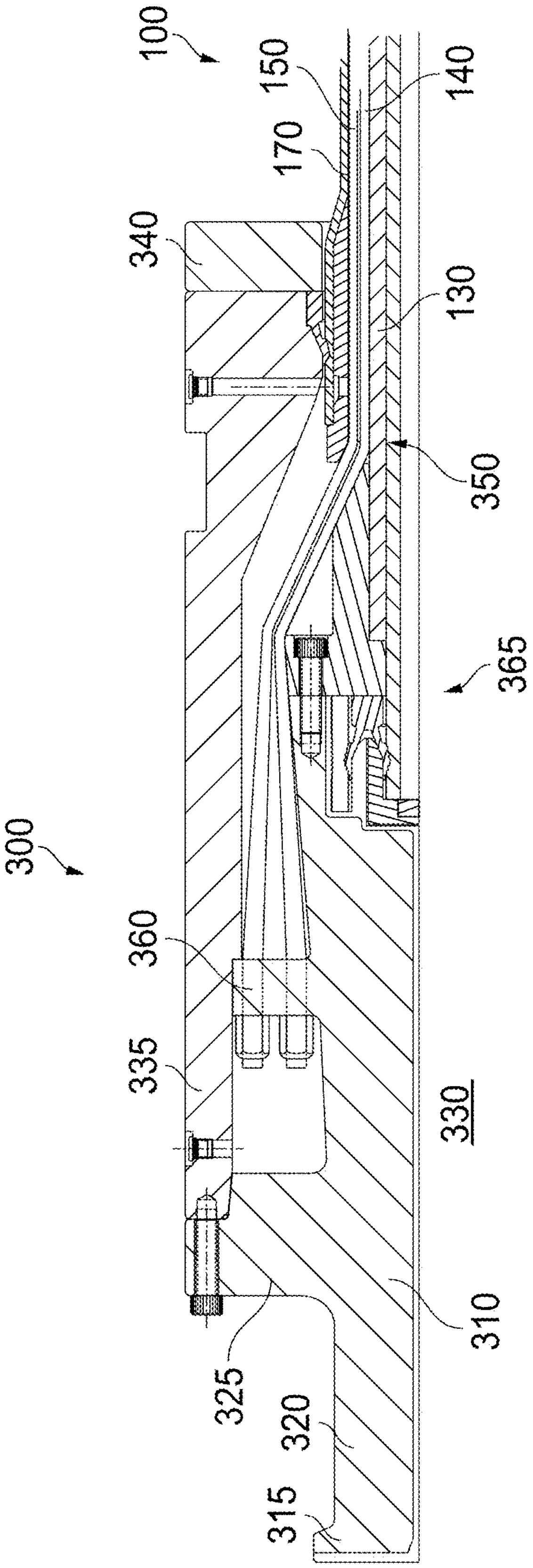
FIG. 3 illustrates an end fitting including an end fitting body and jacket with a rigid flange of the end fitting body being used to secure tensile armour wires.

FIG. 3 illustrates an end of a segment of flexible pipe body 100 terminated in an end fitting 300. The flexible pipe body is terminated in the end fitting via a termination procedure. The end fitting 300 includes an elongate end fitting body 310. This end fitting body 310 includes a connector flange 315 which can be secured to another end fitting in a back-to-back relationship or to a rigid structure as desired. A neck 320 of the end fitting body extends away from the connector flange to an intermediate flange region where an intermediate flange 325 is located. This intermediate flange extends radially outwardly away from a bore region 330 provided through the end fitting body. A jacket 335 is shown secured to the intermediate flange 325 via bolts (other securing mechanisms can of course be utilised). An activation flange 340 is secured to an end of the jacket 335 distal to the connector flange 315. The activation flange 340 helps secure against an outer sheath 170 of the flexible pipe body 100.

FIG. 3 also illustrates how multiple wires from associated tensile armour wire layers (two layers shown in FIG. 3) are terminated within the end fitting. A radially innermost tensile armour layer 140 includes multiple tensile armour wires. A radially outwards further tensile armour wire layer 150 lies radially outside the first tensile armour wire layer 140. These wires are wrapped around an underlying pressure armour layer and begin to lift off away from that underlying pressure armour layer 130 at a lift off point 350 the tensile armour wires then extend towards the rigid flange 360 which extends radially outwards from a region of the end fitting body between the intermediate flange 325 and an open mouth formed at an end 365 of the end fitting body which is distal to the connector flange 315.

Figure 4:
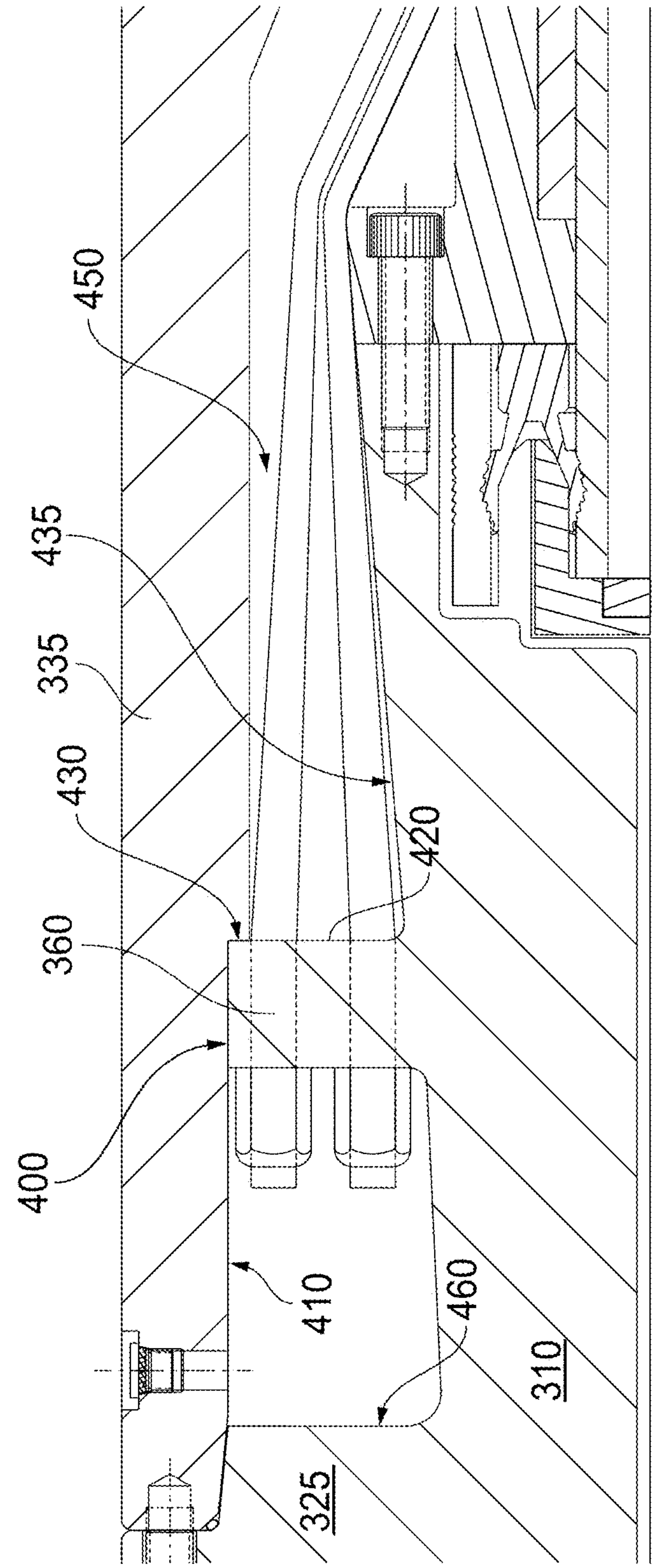
FIG. 4 illustrates a magnified view of the rigid flange of the end fitting body shown in FIG. 3 in more detail.

FIG. 4 illustrates the rigid flange region 360 of the end fitting body 310 in more detail. The flange 360 is integrally formed with the end fitting body along with the neck and connector flange in the end fitting illustrated in FIGS. 3 and 4. The flange extends circumferentially around the whole end fitting body and has a radially outermost edge 400. This edge 400 seats against an inner surface 410 of the jacket 335 and an open mouth end surface 420 which faces towards the open mouth of the end fitting body abuts with a notch 430 formed in the radially inner surface of the jacket 335. This assists orientation in use and improves overall rigidity to the end fitting.

FIG. 4 helps illustrate how the end fitting body has a generally frustoconical outer surface 435 towards its open mouth end so that the end fitting body generally flares out at an end away from the connector flange. A space 450 is created between a radially innermost surface of the jacket 335 and the radially outer surface of the flared out region of the end fitting body. This space 450 includes the ends of the tensile armour wires as they extend away from the lift off point through the rigid flange 360 into a region between the rigid flange 360 and an end surface 460 of the intermediate flange 325.

Figure 5:
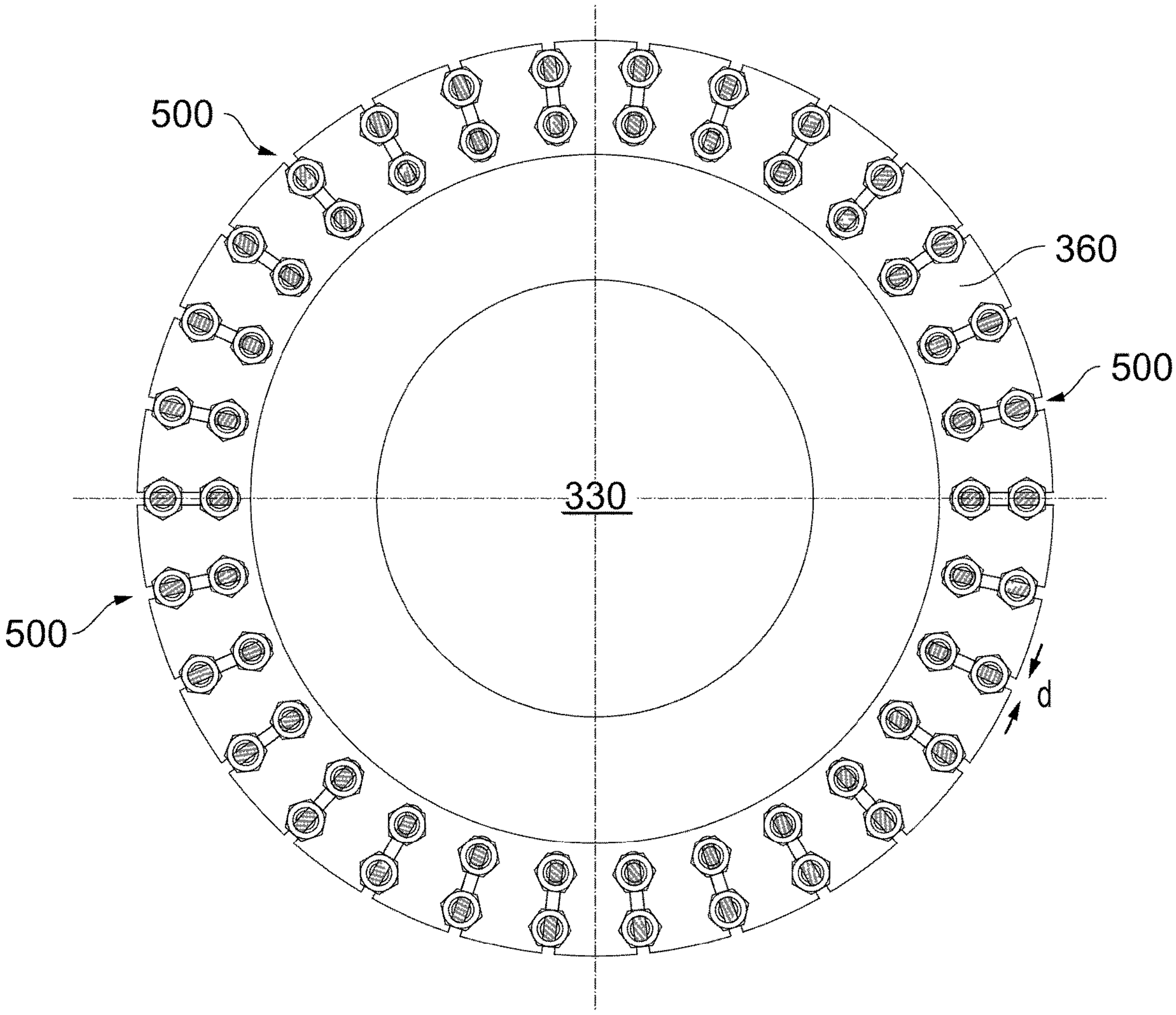
FIG. 5 illustrates through slits arranged circumferentially around a rigid flange of an end fitting body.

FIG. 5 illustrates a face on view of the rigid flange region 360 in more detail and illustrates a view of the flange from the connector flange end. That is to say from the left-hand side end of the orientation shown in FIG. 4. FIG. 5 illustrates how the rigid flange region 360 is generally circular and extends circumferentially around the whole of the inner bore 330 of the end fitting body. Slits 500 are manufactured through the whole width of the rigid flange 360. Each slit is wide enough for tensile armour wires having a predetermined cross section to pass therethrough. Aptly the tensile armour wires have a nonsymmetric cross section and the slits 500 are spaced apart by a distance d so as to receive the wires in only a single orientation. That is to say the width of the slits is smaller than the largest dimension of a tensile armour wire. It will be appreciated that alternatively the slits could be over sized with respect to the wires.

FIG. 5 illustrates how each slit receives a single wire from the radially innermost tensile armour wire layer 140 and a respective single wire from the radially outer tensile armour wire layer. Thirty slits are illustrated in the rigid flange shown in FIG. 5. It will be appreciated that other numbers of slits can be utilised according to certain other embodiments of the present invention and will depend to some extent upon the number of tensile armour wires utilised in any flexible pipe body design. It will likewise be appreciated that rather than including wires from the radially inner and radially outer tensile armour wire layers in any single slit it would be possible to have a set of slits for wires of the radially innermost tensile armour wire layer and a further set of slits for wires in the radially outside tensile armour wire layer. Likewise also it will be appreciated that should the pipe body design dictate that the layers of tensile armour wires comprise different numbers of wires then not all slits may receive more than one wire.

Figure 6:
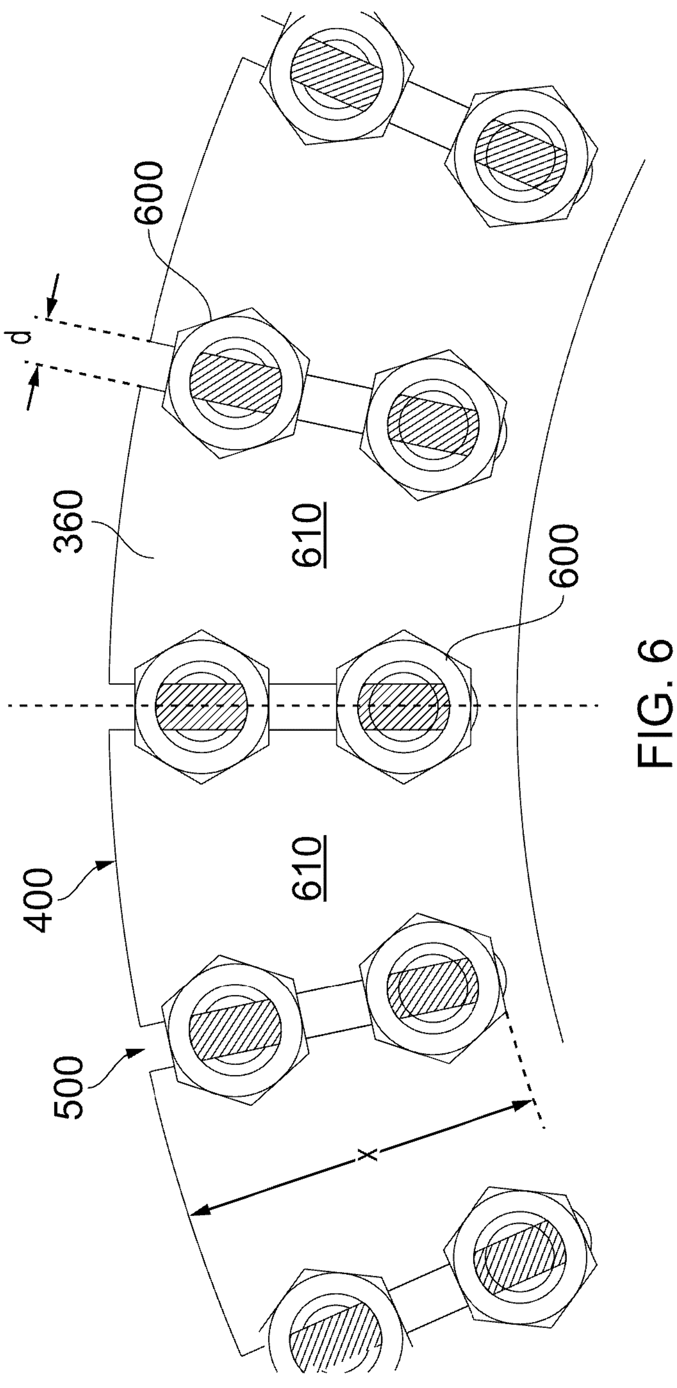
FIG. 6 illustrates how tensile armour wires of a radially inner first tensile armour wire layer and wires from a further radially outside tensile armour wire can be individually and separately secured in the slits of the rigid flange shown in FIG. 5.

FIG. 6 illustrates how a tension in each tensile armour wire layer may be set/adjusted independently and separately for each tensile armour wire terminated in the end fitting. FIG. 6 illustrates how the rigid flange 360 includes multiple slits 500 through the flange. Each slit has a common width d which is a distance between adjacent sections of the rigid flange which extend radially outward from the end fitting body. Each slit 500 has a slit depth x which extends from an opening on the outer edge 400 of the rigid flange a predetermined distance inwards towards the bore 330 of the end fitting body. Instead of through slits, through slots or through holes of various cross sections could be formed and ends of wires threaded therethrough during a termination process.

FIG. 6 illustrates how a respective nut 600 can be secured to an outer surface of the tensile armour wire. In order to do this each tensile armour wire is terminated (the end is cut to a predetermined length) and then is threaded (has a screw thread created) by conventional techniques. That is to say a screw thread is cut into the outer surface of each tensile armour wire. The nut 600 can then be screwed onto the free end of any respective tensile armour wire and then rotated. Eventually the nut is screwed down the free end length of the tensile armour wire and comes into abutment with the abutment surface 610 which is the surface of the rigid flange 360 which faces towards the connector flange of the end fitting body. Each nut 600 can then be screwed further thus tightening the nut against the abutment surface 610 provided by the rigid flange. By utilising a tool which measures or indicates tension this enables a load to be applied to each armour wire separately and individually set. This may be achieved by using calibrated hydraulic bolt tensioning equipment known to those skilled in the art, or applying strain gauges to the wires to verify the stress applied on wires in representative or test end fittings, (this can also be used for validating torque calculations). Alternatively a traditional torque lever or torque wrench may be used on a single nut applied to a wire, applying a pre-determined torque to the wire. It should be noted that washers may also be applied between the nut and the rigid flange 360.

Figure 7:
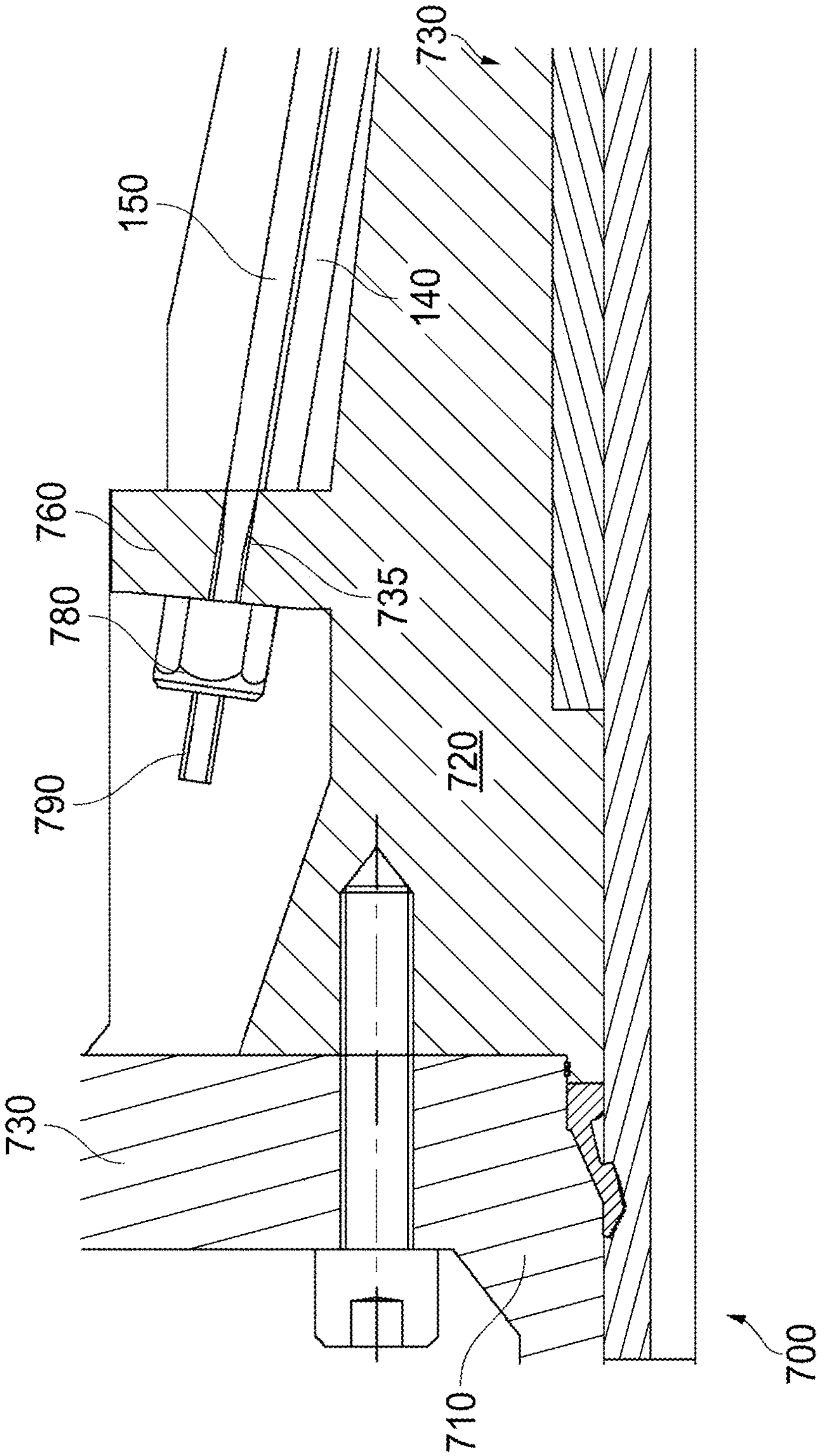
FIG. 7 illustrates an alternative end fitting body which includes a termination member and a core member that includes a rigid flange.

FIG. 7 illustrates an alternative end fitting to that illustrated in FIGS. 3 and 4. FIG. 7 illustrates how an end fitting body can, rather than the end fitting body 310 illustrated in FIG. 3 which is an integrally formed element, be formed from a termination member 710 and a core member 720. These are partially shown in FIG. 7. The termination member 710 provides an intermediate flange 730 to which an end fitting jacket (not shown) can be secured. The termination member 710 has a neck region that extends to the connecting flange of the end fitting in a conventional manner. As illustrated in FIG. 7 the core member 720 secures to the intermediate flange 730 of the termination member. In the core member 720 illustrated in FIG. 7 the intermediate flange is provided wholly by the termination member of the end fitting body. It will be appreciated that alternatively a portion of the intermediate flange could be provided by an end of the core member. As illustrated in FIG. 7 the core member 720 includes a nose 730 which extends towards an end of the end fitting distal to the end where the connecting flange is located. FIG. 7 helps illustrate how a rigid flange 760 is integrally formed with the core member 720 of the end fitting body. The rigid flange 760 includes a set of through holes 735 for the tensile armour wires of the radially outermost tensile armour wire layer 150 and a set of respective through holes for the wires of the radially innermost tensile armour wire layer 140. In FIG. 7 a cross section through the rigid flange illustrates a cross section through a hole used to terminate a respective wire of the outermost tensile armour wire layer.

FIG. 7 helps illustrate how a nut 780 can be secured over a screw threaded outer surface 790 of an end of a tensile armour wire. By tightening the nut 780 the tensile armour wire is effectively pulled away from the segment of flexible pipe body terminated in the end fitting thereby tensioning the tensile armour wire to a predetermined tension. Aptly the tension is between 1 $N/mm^2$ and 2000 $N/mm^2$. Aptly the tension is between 10 $N/mm^2$ and 1000 $N/mm^2$. Aptly the tension is between 10 $N/mm^2$ and 800 $N/mm^2$.

Figure 8:
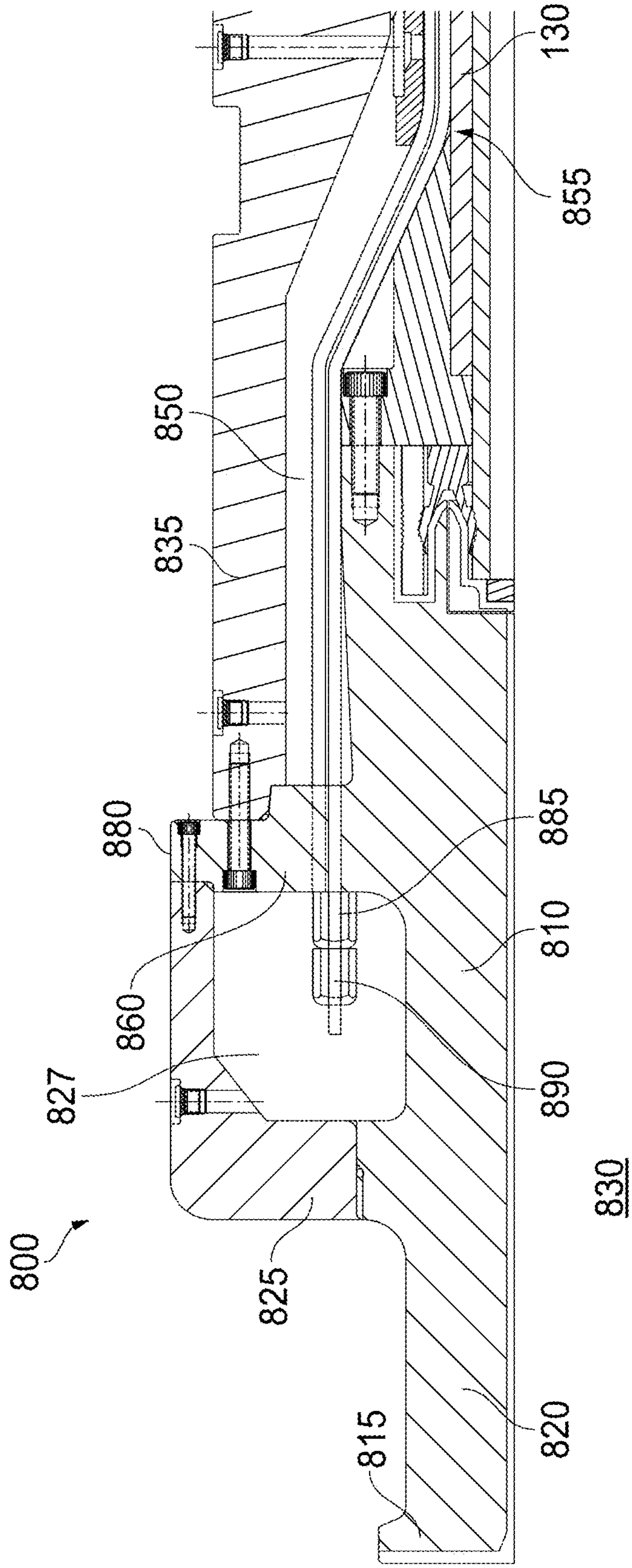
FIG. 8 illustrates an alternative end fitting body and shows also how two nuts can be used to secure a single wire.

FIG. 8 illustrates an alternative end fitting and an alternative way of securing an end of each tensile armour wire. The end fitting 800 includes an elongate end fitting body 810. This end fitting body 810 includes a connector flange 815 which can be secured to another end fitting in a back-to back relationship or to a rigid structure as desired. A neck 820 of the end fitting body extends away from the connector flange to an intermediate flange 825. In the end fitting illustrated in FIG. 8 part of this intermediate flange is separate from the main elongate body 810, is connected to it via a connection means, such as an API type screw thread, with an o-ring seal incorporated, and is arranged to define a cavity 827 between the intermediate flange 825 and a further rigid flange of the end fitting body. The intermediate flange extends radially outwardly away from a bore region 830 provided through the end fitting body. A jacket 835 is shown secured to the end fitting body. The jacket 835 is secured to the end fitting body via the further rigid flange 860. Certain other parts shown are similar to that illustrated and described with respect to FIG. 3. The cavity 827 may in this configuration be left un-filled with epoxy, if desired, at least until after the space 850, inside the jacket, is filled. This allows further tensioning (or confirmation of the pre-applied tensioning) of the armour wires, after the epoxy fill of the space 850. Subsequently the cavity 827 may optionally then also be filled with epoxy, or another suitable void-filling material.

FIG. 8 also illustrates how multiple wires from associated tensile armour wire layers (one layer shown in FIG. 8) are terminated within the end fitting. These wires are wrapped around an underlying pressure armour layer and begin to lift off away from that underlying pressure armour layer at a lift off point 855. The tensile armour wires then extend towards the rigid flange 860 which extends radially outwards from a region of the end fitting body between the intermediate flange 825 and an open mouth formed at an end of the end fitting body which is distal to the connector flange 815.

As illustrated in FIG. 8 the flange 860 is integrally formed with the portion of the end fitting body that defines the bore along with a neck and connector flange. The flange 860 extends circumferentially around the whole end fitting body and has a radially outermost edge 880. In the end fitting illustrated in FIG. 8 the distance from the bore 830 to the edge 880 of the rigid flange is greater than a corresponding distance between the bore and an outer surface of the jacket 835.

As illustrated in FIG. 8 two nuts may be used to secure a tensile armour wire in a desired position and at a desired tension. This two nut methodology can be utilised according to any of the embodiments illustrated in this patent specification. A first nut 885 which is closest to a remaining portion of a specific tensile armour wire and closest to the rigid flange 860 is used to adjust tension in the wire. A further nut 890 is closer to a free end of any particular wire and is used to lock the first tension setting nut 885 at a desired point. This two or more nut approach can be used for all wires or just for selected wires in the assembly.

Figure 9:
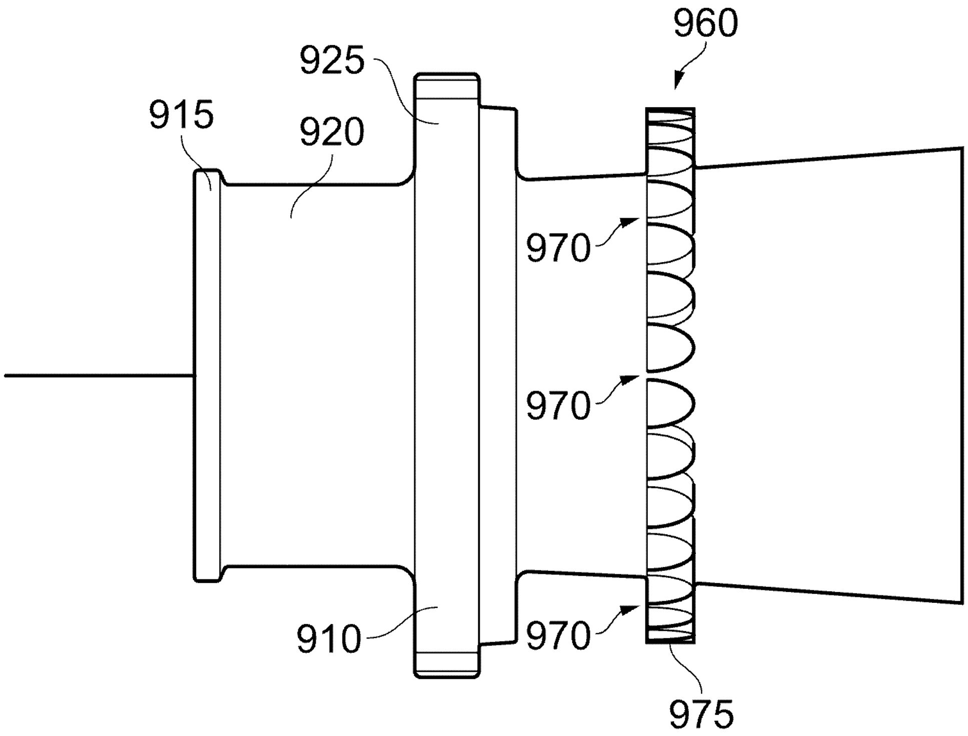
FIG. 9 illustrates guide surfaces on a side of a rigid flange.

FIG. 9 illustrates how certain embodiments of the present invention can include an elongate end fitting body 910. This end fitting body 910 includes a connector flange 915 which can be secured to another end fitting in a back-to-back relationship or to a rigid structure as desired. A neck 920 of the end fitting body extends away from the connector flange to an intermediate flange region where an intermediate flange 925 is located. This intermediate flange extends radially outwardly away from a bore region provided through the end fitting body.

FIG. 9 helps illustrate how a further rigid flange region 960 extends radially outwardly from the main portion of the end fitting body. FIG. 9 helps illustrate a rigid flange with slits 970 which extend radially inwards away from an outer edge 975 of the rigid flange. A first (left hand side in FIG. 9) side of the rigid flange presents a substantially smooth surface broken only by the through slits in the rigid flange. However, a reverse side (the right hand side shown in FIG. 9) includes multiple arcuate surfaces between adjacent slits. The net effect of opposed arcuate surfaces on either sides of any slit is that the curved surfaces act as guides for the tensile armour wires as they are terminated and passed through the slits for securing in a manner as above-mentioned. The arcuate reverse side on the rigid flange can be applied to any of the embodiments previously described which include slits. For certain embodiments a jacket end surface would be made to complement the curved/arcuate surfaces.

Figure 10:
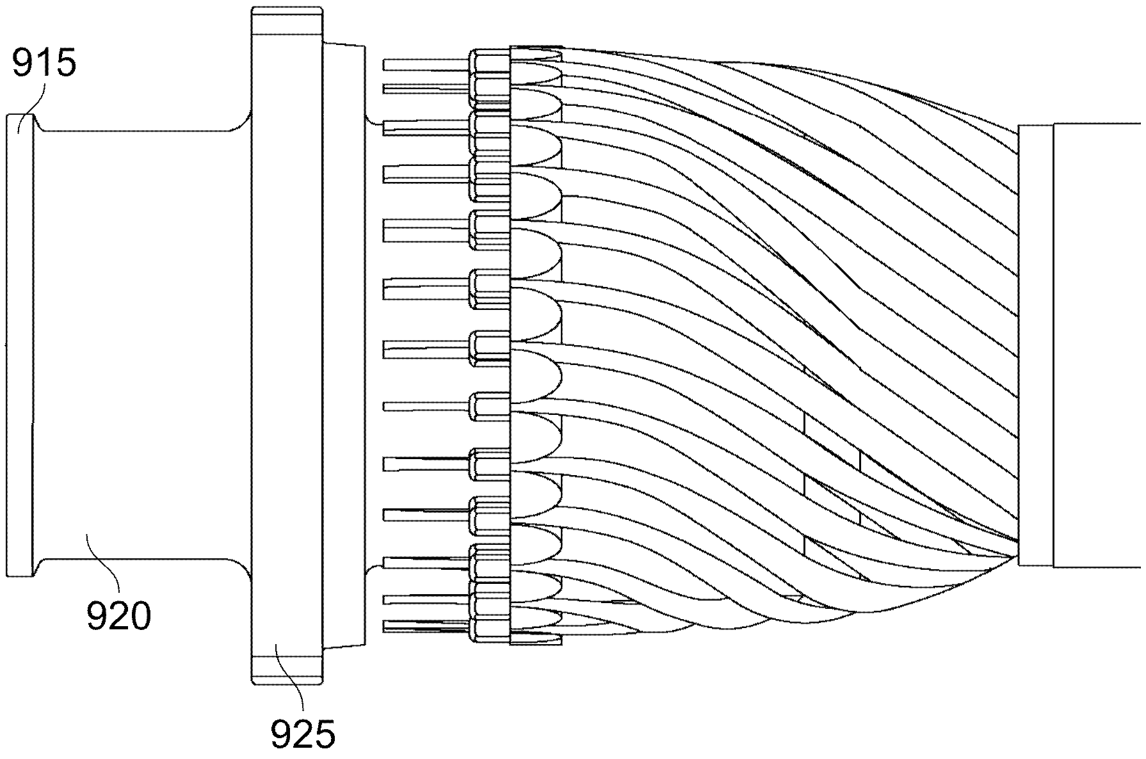
FIG. 10 schematically illustrates tensile armour wires fitted through slots in an elongate end fitting body.

FIG. 10 helps illustrate how these arcuate guide surfaces on either side of a slit can be utilised to help guide each tensile armour wire through a respective slit where the wire can thereafter be secured using one or more nuts in a manner previously described.

It will be appreciated that for embodiments in which through holes rather than slits are utilised in the rigid flange the reverse side (that is to say the side which faces the oncoming tensile armour wires during a termination process) of the rigid flange can include a profile which includes curved depressions surrounding each aperture in the rigid flange. The curved surfaces, which are conical but flared out at the reverse side, drop down into the through holes so that as a free end of a tensile armour wire is urged against the rigid flange the curved guide surface helps direct the tensile armour wire end into the through hole in a manner which makes it easy to then pull the tensile armour wire through the through hole allowing the wire to effectively be threaded through the through hole. Such trumpet shaped guide holes surrounding each aperture in the rigid flange can be utilised with any embodiment using a through hole (rather than through slit) approach.

Thus according to certain embodiments of the present invention a uniform tension can be applied to all tensile armour wires during end fitting via the cutting of a screw thread portion on the edges of wires over a length at the end of each wire. Wires are then fed through a flange which contains angled holes or slits or slots and at another side of the flange nuts are applied onto the wires and tightened against the flange face until a set amount of tension is in each wire. Rather than through slits, through holes or through slots can be utilised. Aptly the holes are angled at an angle which is aligned with the wire pitch angles.

According to alternative methods other wire pre-tensioning methods can be utilised. These can include the hydraulic or pneumatic tensioning of the wires and the application of other gripping devices (cam/wedge/pin and hole etc) holding the wire and acting against the flange of the end fitting. Aptly a tensioner system similar to the Hydratight HL or TS or PS series hydraulic bolt tensioning system could also be used where two nuts are applied to each wire. One nut is utilised to facilitate tensioning of the wire (with small holes drilled) and the other is used to secure the tension in the wire against the flange. Tension loading of the wires does not necessarily need to be large, for instance a small uniform force can be utilised on each wire to ensure tension in all wires is similar.

According to certain other embodiments of the present invention end fittings are provided whereby wires are tensioned after completion of the end fitting process but prior to filling with epoxy. An outer cover or further sealed flange fitting can be applied beyond the wire terminations as shown in FIG. 8. FIG. 8 also shows the feature of applying two nuts to a wire.

Throughout the description and claims of this specification, the words “comprise” and “contain” and variations of them mean “including but not limited to” and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. A method of securing flexible pipe body tensile armour wires in an end fitting, comprising the steps of:

locating a respective free end region of at least one tensile armour wire of an armour layer comprising a plurality of tensile armour wires, through and past an opening defined by a rigid flange region that extends radially outwardly from an end fitting body; and securing the at least one tensile armour wire to the rigid flange region thereby securing said at least one tensile armour wire to the end fitting body;

wherein the opening comprises a through-hole defined by the rigid flange region and the step of locating a respective free end region comprises threading an end of the free end region through an associated through-hole.

2. The method as claimed in claim 1, further comprising: securing each tensile armour wire separately to the rigid flange at a predetermined tension.

3. The method as claimed in claim 2, wherein the predetermined tension comprises a tension of between 1 and 2000 $N/mm^2$.

4. The method as claimed in claim 2, further comprising: securing all tensile armour wires of the armour layer to the rigid flange at a common tension and optionally securing all of a further plurality of tensile armour wires of a further armour layer to the rigid flange.

5. The method as claimed in claim 2, further comprising: providing a respective nut element at a threaded portion of each free end region and selectively rotating each nut element to draw the free end region of an associated wire through an opening in the rigid flange region.

6. The method as claimed in claim 5, further comprising: subsequently tightening each respective locking nut element on each free end region until the locking nut element abuts with a first locking nut element.

7. The method as claimed in claim 1, further comprising: prior to securing each tensile armour wire to the rigid flange, urging the tensile armour wire in a direction generally away from a remainder of the flexible pipe body thereby removing slack from each tensile armour wire between the flange region and a lift off point where the tensile armour wire begins to extend radially outwardly away from an underlying layer in the flexible pipe body.

8. The method as claimed in claim 1, wherein: the end fitting body comprises a connector flange end and an open mouth end proximate to a cut end of flexible pipe body whereby at least an end region of a fluid retaining layer of the flexible pipe body is disposed radially within the end fitting body at the open mouth end.

9. The method as claimed in claim 1, wherein the opening defined by the rigid flange region comprises a plurality of openings circumferentially arranged around the flange region and the method further comprises: locating a respective free end region of each of all tensile armour wires of the plurality of tensile armour wires in a respective opening of the plurality of openings.

10. The method as claimed in claim 1, further comprising: securing a jacket to a central flange region that extends radially outwardly from the end fitting body and that is located at a first longitudinal position spaced apart from a second longitudinal position where the rigid flange region is located; and subsequently securing an activation flange to the jacket.

11. The method as claimed in claim 10, further comprising: providing epoxy material in an enclosed chamber disposed between a radially inner surface of the jacket, an inner surface of the activation flange and a radially outer surface of the end fitting body.

12. The method as claimed in claim 11, further comprising: providing the epoxy material to a first end region of the enclosed chamber at a first side of the rigid flange region via a first epoxy fill port.

13. The method as claimed in claim 12, further comprising: providing the epoxy material to a further end region of the enclosed chamber at a further side of the rigid flange region via a further epoxy fill port.

14. The method as claimed in claim 1, whereby each through-hole has a circular-shaped or elliptical-shaped cross section.

15. The method as claimed in claim 1, wherein: the opening comprises a slit defined by the rigid flange region that extends a predetermined distance from a peripheral edge region of the rigid flange region and said step of locating a respective free end region comprises sliding a selected edge of the free end region radially inwardly into the slit and subsequently urging a free end of the free end region away from the rigid flange region.

* * * * *